UNITED STATES PATENT OFFICE.

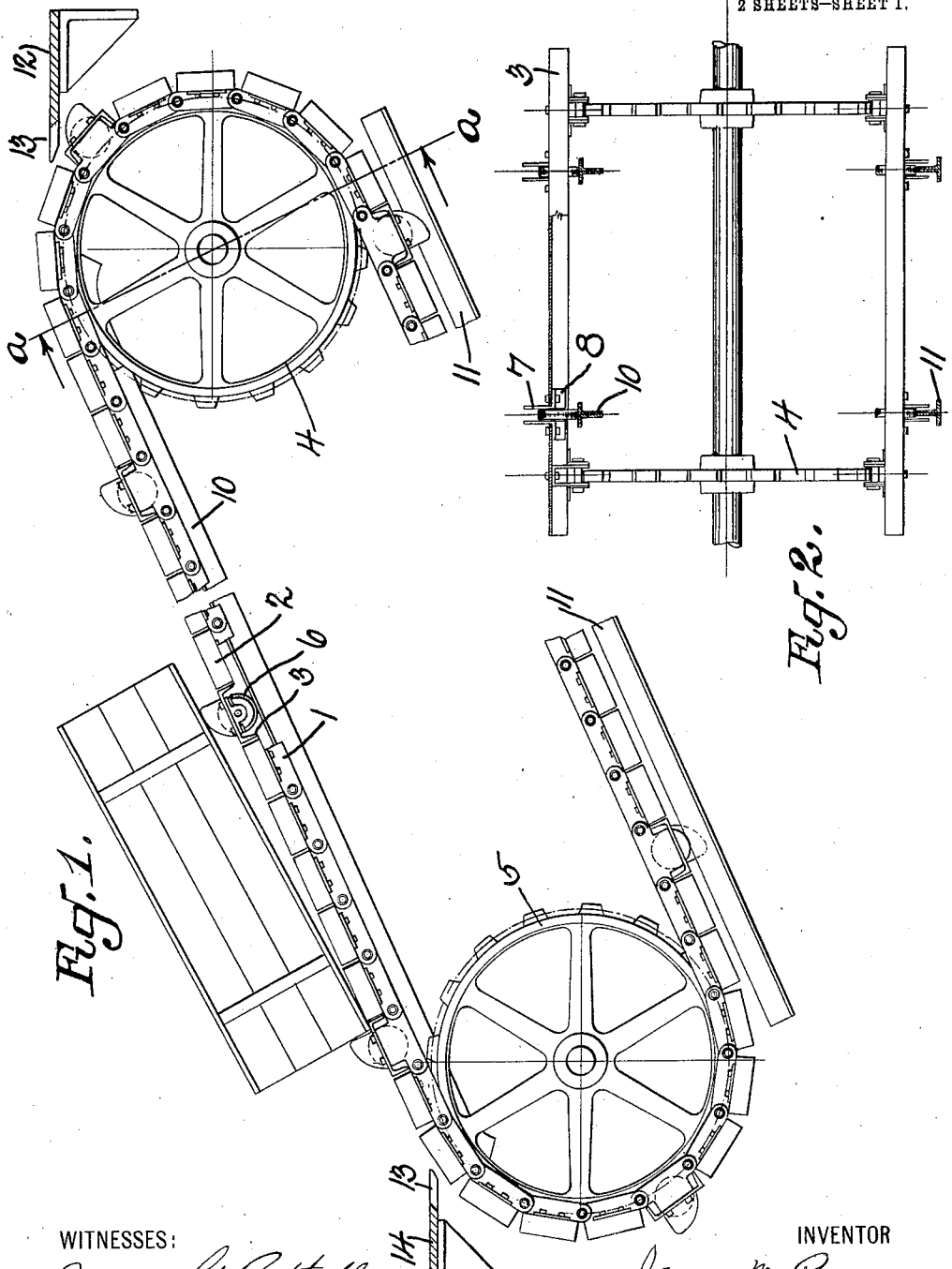

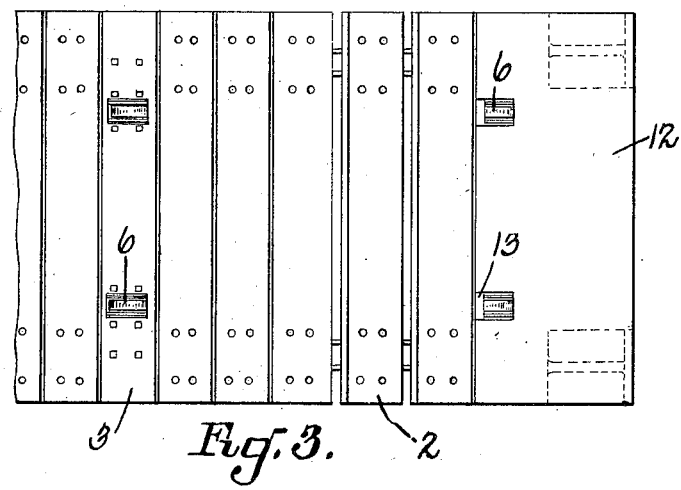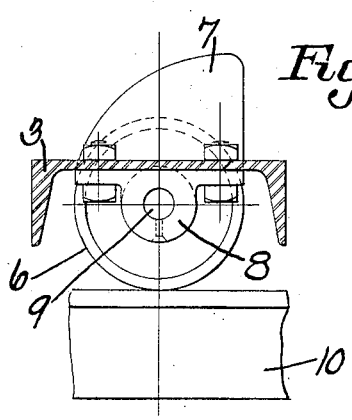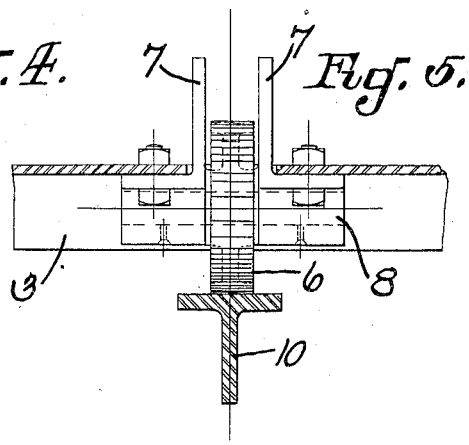

JESSE W. RENO, OF NEW YORK, N. Y., ASSIGNOR TO OTIS ELEVATOR COMPANY, OF JERSEY CITY, NEW JERSEY, A CORPORATION OF NEW JERSEY.

CONVEYER.

1,092,394.  Specification of Letters Patent.  Patented Apr. 7, 1914.

Application filed October 21, 1911. Serial No. 656,042.

*To all whom it may concern:*

Be it known that I, JESSE W. RENO, a citizen of the United States, residing at New York, in the county of New York and State of New York, have invented a new and useful Improvement in Conveyers, of which the following is a specification.

My invention relates to conveyers or inclined elevators, and has for an object the provision of an improved apparatus for conveying merchandise in boxes, barrels or bales, from one point to another, either horizontally or on an incline, by means of an endless moving platform of novel construction.

By my invention I am able to provide a platform of great strength and also to reduce the number of supporting wheels or rollers usually required in moving platforms now in use. Furthermore, a conveyer constructed according to my invention requires less space than others and the arrangement is such as to permit of ready accessibility to all parts requiring lubrication.

Other objects of my invention will appear hereinafter, the novel combinations of elements being pointed out in the annexed claims.

In the drawings accompanying and forming a part of this specification, Figure 1 is a side elevational view of a conveyer constructed according to my invention; Fig. 2 is a transverse section on the line *a—a* of Fig. 1 having one of the treads broken away so as better to show the arrangement of the rollers; Fig. 3 is a plan view of Fig. 1 showing the upper landing and a portion of the conveyer surface; Figs. 3, 4 and 5 illustrate the arrangement of the rollers and the housing therefor.

Like reference characters denote similar parts throughout the drawings.

Referring to the drawings, it is observed that the apparatus comprises one or more endless chains 1 to which are bolted cross slats or treads 2 and 3 which form the conveyer surface. These chains pass around suitable sprocket wheels 4 and 5 at each end of the conveyer and are driven by suitable power mechanism of any desired type such as an electric motor. The treads 2 are preferably made of wood and are arranged in groups, while between each group is a tread 3 which is constructed of a standard steel channel and which carries the supporting wheels or rollers 6. These channels have openings cut in them through which the rollers project above the load carrying surface of the conveyer. In order to protect the rollers from contact with the boxes or bales of freight I provide for each roller a casting 8 (see Figs. 4 and 5) which may be bolted to the under side of the channels and which forms a pair of projecting lugs 7 on each side of the rollers which not only acts as a protecting housing for the rollers but also prevents the load from slipping in case the inclination of the conveyer surface is excessive. The casting 8 also provides a convenient means for supporting the rollers 6, each of the latter being rigidly secured to a corresponding shaft 9 which is journaled in the casting, thereby producing a very strong, compact and durable construction.

It will be observed that the rollers 6 are not located at the outer edge of each channel as is the usual practice, but are moved over toward the center so that the rollers will come more nearly under the load, thereby relieving the channels from excessive bending strains and from shocks resulting from dumping heavy cases of merchandise on the conveyer surface. It will be further observed that the periphery of the rollers projects both above and below the channels so that they not only engage the load carrying tracks 10 but also the return tracks 11 and since the rollers are of a good substantial size they will run with a minimum of noise and friction. It is not necessary to locate these rollers very near together longitudinally of the conveying surface as in most cases a box or bale will span the distance between a pair of adjacent channels even when the latter are separated quite a distance as shown in Fig. 1.

In order to accommodate the lugs 7 at the upper and lower landings 12 and 14 respectively, these landings are cut away at 13 so as to permit the lugs to pass without interference.

The usual method of constructing an endless conveyer is to journal the load carrying rollers at the end of each and every tread or slat, the wheels being of small diameter and set out beyond the ends of each tread so as to engage the tracks which support the return or lower side of the endless series of treads. This construction requires a large number of rollers and a very heavy and massive tread in order to withstand the shock of loading heavy material on the conveyer. Owing to the excessive weight of such construction and to the large amount of friction caused by the numerous small rollers, it is evident that a great deal of power is required and the shafts supporting the rollers are frequently bent or broken. Then again since the rollers usually extend beyond the tread surface together with their tracks and supports, it is evident that the width of the apparatus will be considerable. In a conveyer constructed according to my invention, it is seen that friction is largely eliminated, the treads do not have to be excessively strong or massive, and in operation it will be quiet and economical of power. Furthermore, the extreme width of the conveyer is no more than the width of the treads, and where space is at a premium this feature is of great importance. Since the rollers are large in size and there are but few of them it is a simple matter to lubricate them when necessary, and owing to their construction and arrangement they are easily accessible.

Having described my invention, what I claim is:

1. In a conveyer, the combination of an endless chain, a plurality of wooden and metal treads or slats secured to said chain so as to form a load carrying surface, rollers carried by said metal treads, a track coöperating with said rollers, and devices projecting above said surface in position to engage articles to be conveyed and to protect the rollers from contact with said articles.

2. In a conveyer, the combination of an endless chain, treads or slats secured to said chain so as to form a load carrying surface, rollers carried by said treads intermediate the ends thereof and extending above said surface, protecting devices for the rollers positioned to form abutments for articles being conveyed, and a track coöperating with the rollers.

3. In a conveyer, the combination of an endless chain, treads or slats secured to said chain so as to form a load carrying surface, rollers carried by said treads and projecting through said surface, tracks coöperating with said rollers, and housings for the projecting portions of the rollers.

4. In a conveyer, the combination of an endless chain, treads or slats secured to said chain so as to form a load carrying surface, rollers carried by and extending through said treads and located intermediate the ends thereof, tracks coöperating with said rollers, and housings for the rollers.

5. In a conveyer, the combination of a load carrying surface comprising a plurality of treads or slats, and rollers lying in slots in said treads with their axes transverse to the direction of travel.

6. In a conveyer, the combination of a load carrying surface comprising a plurality of treads or slats, rollers lying in slots in said treads, and housings for the rollers positioned to prevent contact between the rollers and articles on the carrying surface.

7. In a conveyer, the combination of a load carrying surface comprising a plurality of wooden and metal treads, or slats, said metal treads being provided with slots, and rollers arranged in said slots with their axes perpendicular to the direction of travel.

8. In a conveyer, the combination of a load carrying surface comprising a plurality of wooden and metal treads or slats, said metal treads having slots therein, rollers arranged in said slots, and a housing for said rollers.

9. In an endless conveyer, the combination of a load carrying surface comprising a plurality of treads or slats, rollers carried by said treads intermediate the ends thereof and extending above the surface of the treads, and load carrying and return tracks coöperating with said rollers.

10. In an endless conveyer, the combination of a load carrying surface comprising a plurality of connected treads or slats, rollers carried by said treads intermediate the ends thereof and extending through both sides of the treads, a housing for the rollers on the load carrying surface of the treads, and load carrying and return tracks for said rollers.

11. In a conveyer, the combination of a plurality of treads or slats, having slots therein and connected together so as to form a load carrying surface, a casting arranged at each slot, shafts journaled in said castings, and rollers carried upon said shafts and extending above the load carrying surface, said castings extending above the rollers and forming housings therefor.

In testimony whereof, I have signed my name to this specification in the presence of two subscribing witnesses.

JESSE W. RENO.

Witnesses:
JOSEPH C. GRAVES,
M. V. DUNNE.